United States Patent [19]
Catron

[11] 4,340,402
[45] Jul. 20, 1982

[54] DISPOSABLE AIR FILTER

[75] Inventor: George W. Catron, Sacramento, Calif.

[73] Assignee: Walt R. Philipanko, Sacramento, Calif.

[21] Appl. No.: 196,612

[22] Filed: Oct. 14, 1980

[51] Int. Cl.³ .............................................. B01D 50/00
[52] U.S. Cl. ....................... 55/487; 55/501;
   55/514; 55/511; 55/527; 55/528; 55/DIG. 31;
   55/DIG. 45
[58] Field of Search ......................... 55/482, 485–488,
   55/528, 501, 511, DIG. 45, 514, 527, DIG. 31

[56] References Cited

U.S. PATENT DOCUMENTS

| | | | |
|---|---|---|---|
| 2,138,874 | 12/1938 | Myers | 55/527 |
| 2,677,436 | 5/1954 | Mazek | 55/518 |
| 3,023,839 | 3/1962 | Best | 55/509 |
| 3,458,130 | 7/1969 | Juhlin | 98/101 |
| 3,727,769 | 4/1973 | Scholl | 55/511 |
| 4,115,082 | 9/1978 | Newell | 55/DIG. 31 |
| 4,129,430 | 12/1978 | Snow | 55/485 |
| 4,240,420 | 12/1980 | Riaboy | 55/514 |

*Primary Examiner*—Bernard Nozick
*Attorney, Agent, or Firm*—Mark C. Jacobs

[57] ABSTRACT

A dual filter system for heaters and airconditioners comprising releaseably securable throwaway secondary filter secured to a disposeable or permanent primary filter.

5 Claims, 6 Drawing Figures disposal of the secondary filter. It is not recommended that these be washed or otherwise cleaned, due to the fact that the cardstock frame can become warped due to its becoming water logged.

DESCRIPTION OF THE PREFERRED EMBODIMENT

In FIG. 1 there is shown an air filter embodying the features of this invention, and which comprises a dual layer filter. In the primary filter 13, here designated 59, the filter medium 61 is affixed into the channelling of a frame 60. Frame 60 comprises four sections, namely 63, 65, 67 and 69. In FIG. 1 the primary filter 59 includes a fibreglass filter medium 61. The frame extends around the periphery of the batt 61 to hold it, the medium 61 in place. The filter medium of this figure is seen to be over layed with a metallic punched layer, 71, for stiffness.

The primary filter 83 of FIG. 5 is capable of being substituted for the primary filter 13 in FIG. 1. The filter 83 includes a frame 80 which has a polypropylene layer as its filter medium 81. Such polypropylene filter medium is available in the marketplace from Chicopee Manufacturing Company of Cornelius, Ga., and is designed for passage of air or other gases through same. The frame 80 employed therein is of a very rigid plastic which may be extruded, preferably A.B.S.

Some further details of filter 13 will be discussed with respect to the filters of FIG. 5 and 6 per details recited below. However, both of these primary filters 83 and 59 are well known in the art.

FIG. 1 is seen to be an exploded item illustrating the fact that the secondary filter 11, to be described below is intended to be superposed upon primary filter 13. The disposition of filter 11 upon filter 13 is intended to be a releasably adhesed mounting such that the four corners of each filter are aligned. Typical configurations of suitable throwaway filters employable as filter 11 are shown in FIGS. 2 and 4. Each of these is shown in cross section. For ease of comprehension the section is seen to have been taken along the line A—A of FIG. 1.

For ease of understanding, the reader should note that as indicated this invention comprises a two part filter system, namely a primary filter designated 13 in FIG. 1, and described therein briefly; and a secondary filter which is to be releaseably secured to the primary filter, and which is shown in FIG. 1, designated 11, but not discussed in detail.

Filter 13, though shown in FIG. 1 in one version, 59 has also been indicated to be employed in another version namely that shown in perspective in FIG. 5. Details of the FIG. 1 version are recited in the discussion of FIG. 3, with the details of the second version being recited with respect to filter 83 in the discussion of FIG. 6.

It should be further understood, that while filter 59 is related to the FIG. 3 filter 39, ie. employing a fibreglass batt, the construction of each is sightly different. While necessary for the purposes of a patent application to explain such details, the important point of distinction for the reader, is not the details of the several constructions, filter 59 versus filter 33; but rather the classes of filter namely fibreglass batt as illustrated by both filters 59 and 33 as distinguished from the woven filter medium of filter 83, which employs polypropylene or some other plastic fibre therein.

The discussion will begin with a description of the secondary filter 11, since it forms the heart of the invention and because as indicated above the several classes of primary filter employed in the combination of this invention are each known to the art as separate structures, capable of solo operation.

Turning now to FIG. 2, filter 11 is seen to comprise a single thickness of fibreglass in sheeted flexible form, 23, usually of a thickness of from about 0.01 to 0.03 inches. Such flexible fibreglass sheeting is available in the marketplace from such vendors as Stacy Frabrics Corp. of N.Y., N.Y.

Disposed around the periphery on the top surface 23A of said fibreglass sheet adhesively secured to said sheet 23 via 17 is a cloth or plastic layer 15. Usually this layer extends inwardly from the edge about $\frac{3}{4}''$ depending on the overall dimensions of filter 11. Adhesive backed cloth and plastic tapes, capable of adhering to fibreglass are readily available in the marketplace. Since most filters come in a black or grey color, such colors are suggested for tape 18 or cloth to be employed as layer 15. Disposed also around the periphery of layer 23, on the underside thereof, designated 23B, and of an inward extension corresponding to that of layer 15 is layer 27.

Layer 27 is any adhesive capable of adhering to fibreglass and to the intended substrate, here cardstock or plastic as may be chosen for the primary filter's frame.

Any adhesive capable of adhering to fibreglass sheet 23 and to the intended substrate may be employed. Such adhesives 27 include water based self-crosslinking acrylcis (National Starch 33-4500). Such adhesives are readily available in the marketplace. For the purpose of ease of packaging, however, it is suggested that a release layer, designated 19, be applied to the adhesive in order to preserve the adhering capability of the adhesive. Such release layer materials are also known to the art and form no part of this invention. The failure to provide the release coat, would necessitiate that the packaging for the secondary filter be of such a nature that the adhesive layer 19 would not adhere to the interior of its package. The adhesive layer 27 and its cover or release layer 19 should be such that they extend inwardly from the edge of the fibreglass layer 23 no further than tape layer 18. Adhesive layer 27 is seen to be pressure sensitive for mere finger pressure will cause it to adhere to the substrate of the frame of the primary filter 13. However, the attachment is to be of a releasable nature such that the secondary filter can be pulled off with minimal effort, yet is stable enough to remain in place during periods of use.

Rather than employing an adhesive, which must be coated or sprayed directly upon the underside of the fibreglass layer 23, one can choose to substitute for the adhesive 27, a doublefaced pressure sensitive tape having adhesive on both sides thereof, 48. Such an embodiment is shown in the sectional view of FIG. 4 which is also taken along the line A—A of FIG. 1. In FIG. 4, designator 45 pertains to the cloth, layer as previously discussed with respect to tape layer 18.

For ease and convenience of the reader, the adhesive layer which would correspond to layer 17 of FIG. 2 is also shown in FIG. 4. Obviously it is readily recognized that such an adhesive layer is necessary and accordingly would form a part of the tape if tape were employed instead of cloth or vinyl with a separate adhesive.

Disposed beneath the tape layer 48 is the single thickness of fibreglass filter medium designated 43. Adequate discussion will be presented with respect to this layer at the area of this application pertaining to layer 23 of FIG. 2 below.

DISPOSABLE AIR FILTER

BACKGROUND OF INVENTION

1. Field of the Invention

The present invention relates to permanent air filters, and is more particularly concerned with an air filter which includes a throwaway cover protion therein.

2. Description of the Prior Art

It is known to make a filter by sandwiching a glass fiber batt and at least one stamped metal sheet disposed on the side of impact of the moving air upon the fibreglass, and preferredly a metal sheet in each side of the fibreglass to hold the parts together. Such a filter is commonly used to remove particulate matter from air used in heating and air conditioning systems. Such a filter has several disadvantages. First, it is relatively flexible and thus easily distorted upon insertion into the filter holder. Second, the dust accumulates only on one side, but since the frame is usually card stock, the filter cannot be washed off and reused easily as the fibreglass is not cleanable and the card stock becomes water logged.

In general, air filters of the prior art have a porous filter medium of substantial thickness comprising a fluffy mass of glass fibers generally bonded at the outside edges where they touch one another by means of a suitable adhesive to yield a batt. A complementary frame is provided to support the filter medium layer.

An example of an early form of air filter embodying glass fiber filter medium is found in U.S. Pat. No. 2,677,436 showing a frame consisting of I-beams and skeletonized wire network panels covering the opposite faces of the filter layer.

The advantage of leaving at least one face of the filter layer for substantially free entry of air is shown in U.S. Pat. No. 3,023,839 wherein both faces are relatively unimpeded.

The design of the air filter has remained substantially unchanged since its early introduction. Such structure comprises the filter element formed of a core of glass fibers bound together by small particles of a resinous binder and often coated with a thin transparent film of a viscous non-volatile oil, to retain airborne particles impelled against the fibers by the air movement. The filter element is retained between two closely perforated sheets of brass metal commonly known and available as bottle cap scrap. The filter and the pair of perforated confining brass sheets are held together within an inwardly facing U-channel of a hollow frame of sturdy but inexpensive fiberboard, often decorated and reinforced by an overlay of imprinted paper tape. The side pieces of fiberboard are glued with an adhesive such as a hot melt or pressure-sensitive adhesive, or stapled together at their ends to form the corners of the frame. This type of filter is readily available today and is used in millions of homes as a throwaway filter which is changed every three to six months. People however have changed their buying habits for several reasons. The era of throwaway items is declining as people realize the necessity to conserve raw materials, not only in the U.S. but worldwide. In addition, many people psychologically would rather buy one good product to carry out a service, which product can be renewed for further use such as the filters of this invention.

SUMMARY OF THE INVENTION

Figure 1:
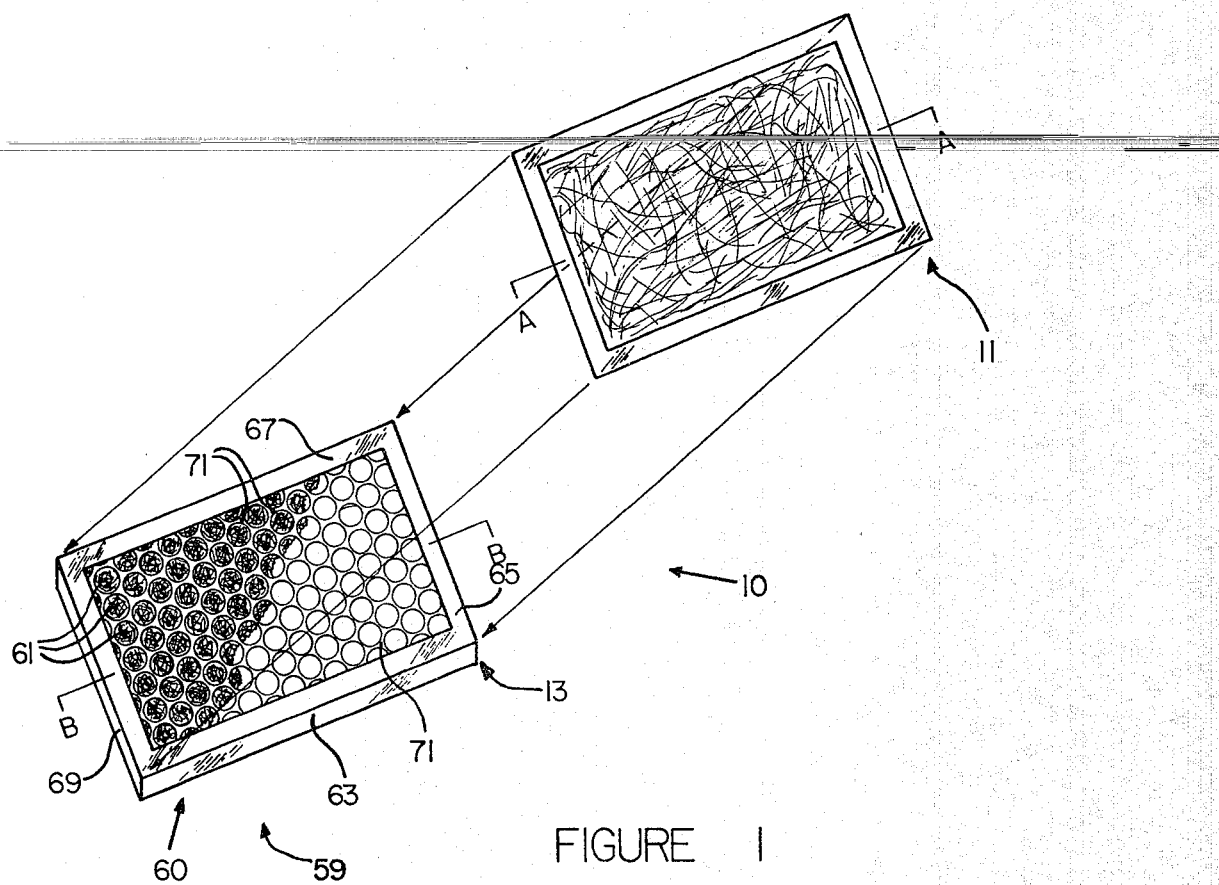
FIG. 1 is an exploded view of this invention.

It is an object to provide an air filter which employs an overlay releaseably attachable throwaway filter in conjunction with either a permanent or disposable primary filter.

It is an additional object of the invention provide an air filter which is simple in assembly and which can be used on both sides, if such is desired.

An important object of the present invention is to provide a new and improved air filter which will overcome the disadvantages, deficiencies, inefficiencies, shortcomings and problems in prior air filters of the type having a porous filter medium layer supported in a complementary frame.

Still another object of the invention is to provide a new disposable air filter combination comprising a relatively thin frequently replaced secondary filter for use in conjunction with a permanent or less frequently disposable main filter.

It is a further object to provide a filter which can be readily renewed for use by disposing of the supplementary filter, and reinstalling a new supplementary filter upon the primary filter.

A still further object is to provide a filter having two components, one a main permanent or less frequently disposed main filter, and a second often disposed secondary filter.

A yet further object is to provide a long-wearing filter of increased efficiency.

Other objects, features and advantages of the invention will be readily apparent from the following description, taken in conjunction with the accompanying drawings, although variations and modifications may be effected without departing from the spirit and scope of the invention as embodied in the disclosure.

According to the invention, there is provided a main filter comprising either a e.g. acrylonitrile-butadiene-styrene frame into which is inserted a woven multi-ply polypropylene filter media which is secured into the channeling of the frame by a suitable adhesive, or other means; or a standard disposable cardstock overlayed with tape frame having a fibreglass batt sandwiched between two layers of punched thin metal inserted, in said frame sometimes these latter have the metal layer which is used to provide stability without affecting air flow, only on one side of the batt.

The first type of filter mentioned as a primary filter, may be renewed by washing the polypropylene filter medium, to remove the dust and dirt that penetrated the secondary filter. The second type is normally not renewable.

However, due to the instant invention, as will be explained in detail, these can be renewed for a second use due to the fact that most dust is carried off by the Positioned on the underside of layer 43 namely on side 43B is an adhesive layer 47. Such adhesive layer may be sprayed, coated or otherwise applied to said fibreglass underside. The inward extension of said layer should correspond to the width of tape 45, such that a neat appearance is maintained and for the fact that excess adhesive does not bleed up through the fibreglass layer 43 and become spotted on the top surface of said fibreglass filter medium.

Layer 47 is an adhesive layer capable of adhering to the underside of fibreglass monolayer 43B, and said adhesive must also be adherable to a superposed cloth or other substrate 51, disposed thereunder. The substrate superposed beneath the adhesive layer 47 and designated 51 would normally be cloth or a flexible plastic. Said plastic or cloth layer would extend inwardly from the periphery of the secondary filter a distance equal to that of the tape layer 45.

Superposed beneath said cloth or plastic layer 51 is a second adhesive layer 57. Adhesive layer 57 need not be capable of adhering to fibreglass and its requirement is only that it be capable of adhering to the frame of the primary filter, be it rigid plastic such as ABS or paper tape covered cardstock as discussed with respect to the embodiment of FIG. 1.

Figure 2:
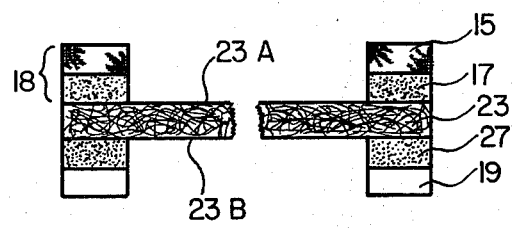
FIG. 2 is a sectional view of one portion of this invention taken along line A—A.
Figure 4:
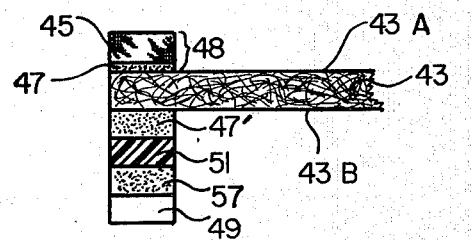
FIG. 4 is an alternate configuration or one portion of the invention.

Disposed beneath adhesive layer 57, termed the second adhesive is a cover or release layer 49, similar to the layer 19 of FIG. 2. Such layers are usually of a paper which isso treated that reapplication to the adhesive from it was removed is uaually quite difficult if at all possible. Such release adhesive protection layers are standard in the art of pressure sensitive labels, and as such have been described in many patents previously. Suffice it to say howver, that the holding quality of adhesive 47, ie. its affinity, of it the fibreglass monolayer 43 must be greater than the adhering qualifications of adhesive 57 to the frame of the primary filter, or else it would be impossible to dispose of the dust filled secondary filter 11.

Turning now to the description of the various primary filters, it is seen that filter 13, the lower filter of FIG. 1, is constituted in brief of a channel-like rectangular frame having a filter medium disposed therein, and optionally secured therein as well. Reinforcement material may be provided, such as the bottle cap scrap shown in FIG. 1, as may be needed or may be desired. Reference is made to designator 71.

Figure 3:
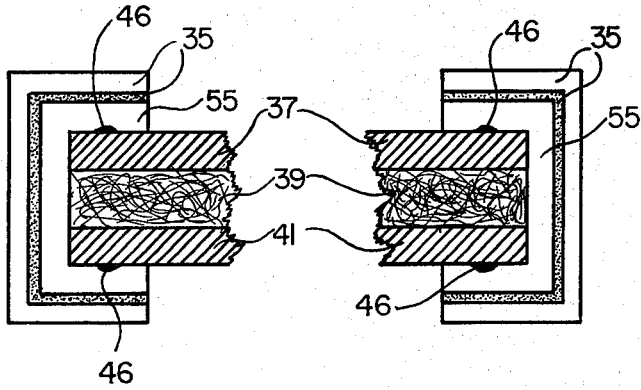
FIG. 3 is a sectional view of the second portion of this invention taken along line B—B.

The conventional periodically disposeable filter employed in home heating and airconditioning systems is shown in cross-section in FIG. 3. Said section is taken generally along the line B—B of FIG. 1. The filter comprises a frame, usually of cardstock channelling. Said channel includes a long side as its elevation and two equally sized inwardly extending generally normal thereto short sides. The interior distance between the two short sides is sized to receive the several layers to be inserted therein, in a snug fit. Thus channel 55 is sized to carry all of the layers, namely a sandwich of bottle cap scrap 37 and 41, with the filter medium 39 disposed there between. Filter medium is a fibreglass batt, usually of about ½ inch thinckness. Metallic layers 37 and 41, are preferably made of a non-rustable material, such as thin brass, to reduced the accumulation of further solid particles due to the formation of surface rust, if inexpensive steel were to be employed. The rust just mentioned would arise due to the presence of moisture or humidity in the airflow.

While filters are available in the marketplace that are reinforced on one side only, for the purpose of this invention I prefer to use those of the configuration as shown in FIG. 3 when the fibreglass batt class of filter is employed as the primary filter. The reason for this, is the fact that the chance for error in positioning with or against the airflow is eliminated, when one inserts the primary filter of this invention into the heater, after the secondary filter has been applied to it previously. That is to say, there is no right or wrong side for the application of the secondary filter, and therefore it is impossible to misinsert the filter system of this invention into the heater. The above discussion presumes the fact that it is generally known to homeowners that the reinforced side of a one side reinforced by metal surface filter is inserted with the metallic side on the exit side of the airflow through the filter.

Returning now to FIG. 3, metallic layers 37 and 41, are usually of less than 1/16th in. thick brass or galvanized iron, with circular spaced holes of about 1" in diameter positioned in aligned rows, with a minimum amount of metal between each punched hole. The preparation of such metallic layers is known to the art and is employed in filters available in the marketplace today. Thus further details on the nature of layers 37 and 41 need not be recited.

Disposed between theese metallic layers is a fibreglass batt 39 usually of from about ½ to 1 inch in thickness. Such batts are available in the market today and are manufactured by several companies, such batts are considered to be conventional. Due to the inherent nature of the fibreglass, it tends to stick to and become entangled with the two metallic layers, 37,41. If desired the batt may be adhesed to the metallic layers 37,41 using any compatible operaable adhesive.

At spaced locations, at the interface of each metallic layer with the cardstock channel 55, an adhesive tack 46 may be provided to add structural rigidity. Every 4" is a recommended spacing for such adhesive dollops.

For both strength and to a degree cosmetic purposes, cardstock channel 55 may be overlayed with an adhesive tape 35 in any suitable color. Black and grey are again recommended, though any color may be employed. Color coding by size of frame is seen to be beneficial to both the manufacturer and the customer. While a vinyl plastic tape may be employed, a paper tape will suffice.

Figure 5:
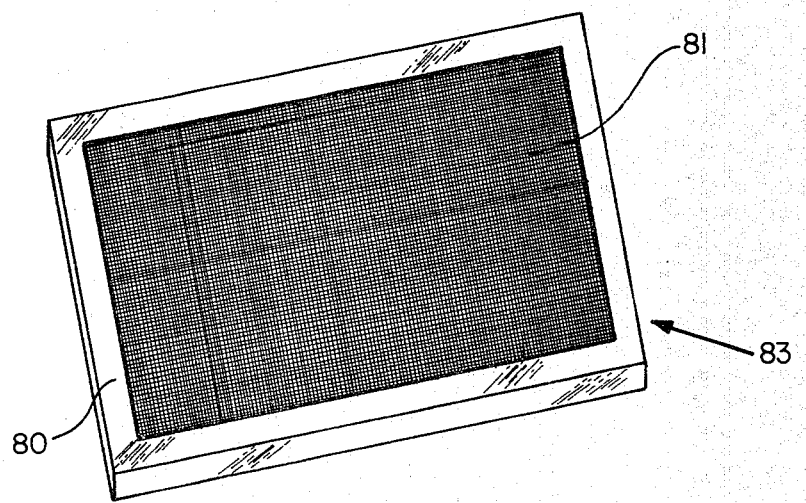
FIG. 5 is a top plan view of another embodiment of this invention.
Figure 6:
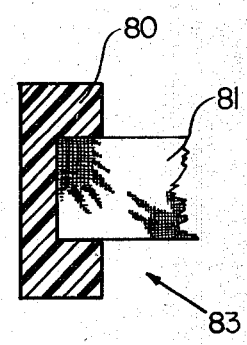
FIG. 6 is a cross-sectional view of the filter of FIG. 5 which forms one part of the invention herein.

In FIG. 6, a cross-sectional view of the filter of FIG. 5 is seen. Such a filter 83 comprises a channel-like frame 80 having a filter medium 81, usually of a woven polypropylene or other fibreforming polymer disposed therein. While a wedge fit of the filter medium 81 into frame 80 will suffice, many manufacturers prefer to secure the medium to the frame as by the application of an adhesive or heat at the medium to frame interface. Such procedures are well known and form no part of this invention.

It is now seen that any primary filter available in the marketplace can form one component of the dual filtration system of the instant invention. The only requirement that the operator must meet, is to determine that the adhesive on the underside of the secondary filter is capable of adhering to the surface of the frame of the primary filter.

USE AND ADVANTAGES

The invention of this application has been shown to consist of a two part filtration system. One of which parts is frequently thrown away, the other of which may be a permanent filter or in the alternative can be a disposable filter. With the former type, it will be less frequently necessary to clean the primary filter element as by washing down with a hose. With the second type, the rate of disposal will be cut down tremendously. Some people may in fact even choose to reverse the direction of air flow, and thus attempt to trap dust on the former exit side of filter 13. This is possible, since only disosable filters that are reinforced on both sides are suggested for employment in this invention. The reason for this however, is not primarily for the cost savings available if desired, but rather to prevent any question from arising as to which side of the primary filter is supposed to face the adhesive surface of the secondary filter, 11.

In order to employ the filter system of this invention anyone, even a child need merely remove the protective layer from the rear adhesive layer of the secondary filter, ie. the new replacement element, and attach and align the replacement element 11 to the main element by the application of finger pressure to releaseably secure the replaceable element 11 to primary element 13. Since the thickness of the secondary element, which receives the first impact of dust is relatively negligible, no interference is created for the insertion of the primary filter element, which has had the secondary one attached thereto, into its normal location in the heater or air conditioner.

When the time arises to replace filter 11, it is merely lifted off of the filter 13 by slightly pulling it from said main filter. At that time the side of the main filter adjacent the secondary filter is inspected to determine the need for cleaning or replacement, as the case may be. The new secondary filter 11, is applied in the manner recited previously and the filter combination is installed from whence it was removed.

The filter system of this invention provides an inexpensive and easily replaced "dirt surface" that will save the operator money by extending the life of the regular primary filter. The frequency of filter changes of the primary filter of course varies with the type of and condition of the furnace and air conditioner, and upon the geographic location, weather, home design and other variables. But in general a saving of over 50% is to be anticipated. With cleaner filters, the heater or air conditioner will use less energy and require less maintenance.

In conclusion it is seen that I have described a unique and highly beneficial dual filtration system for home and industry. The system of the instant invention may be employed with any furnace or air conditioner with no modification of the air conditioner or heater.

I claim:

1. A filter system for removing particulate and dirt from the airflow of: heaters and air conditioners comprising: a primary filter and a secondary filter releasably secured thereto and in axial alignment therewith, said secondary filter being the first impact surface of dirty air, such that the airflow passes first through the secondary filter and then through primary filter wherein the primary filter comprises a conventional generally rectangular frame formed from suitably cut and scored cardstock comprising a plurality of interconnected from members, each of which is generally U shaped in cross-section, said frame carrying a sandwich of a metallic layer adapted to pass air therethrough and wherein the secondary filter comprises a generally rectangular thin sheet of filter medium sized substantially the same as the frame of the primary filter, said secondary filter being superposed upon said primary filter, said secondary filter medium being adapted to remove dirt and particulates from an airflow, said secondary filter having a pressure sensitive removable adhesive layer on one side thereof, said adhesive being capable of releasably binding said sheet to the outside of the frame of the primary filter.

2. The filter system of claim 1 wherein the primary filter's frame is adhered around the periphery to each metallic layer.

3. The desire of claim 1 wherein the filter medium of the primary filter is a fiberglass batt.

4. The desire of claim 1 wherein the primary filter comprises a frame, opening inwardly and adapts to receive a woven polymeric filter matt for filtering dust and particulate disposed in said primary.

5. The filter system of claim 1 wherein the primary filter has a metallic layer only on one side of the filter medium of said primary filter.

* * * * *